(12) United States Patent
Kubajak et al.

(10) Patent No.: US 10,140,817 B2
(45) Date of Patent: Nov. 27, 2018

(54) BILL VALIDATION AND CASH DISPENSING DEVICE, SYSTEM AND METHOD FOR USE IN A CASINO CONTEXT

(71) Applicant: JCM American Corporation, Las Vegas, NV (US)

(72) Inventors: David Kubajak, Las Vegas, NV (US); Mike Nguyen, Las Vegas, NV (US); Mark Adams, Las Vegas, NV (US)

(73) Assignee: Japan Cash Machine Co., Ltd., Osaka (JP)

( * ) Notice: Subject to any disclaimer, the term of this patent is extended or adjusted under 35 U.S.C. 154(b) by 0 days.

(21) Appl. No.: 15/482,615

(22) Filed: Apr. 7, 2017

(65) Prior Publication Data

US 2018/0082516 A1 Mar. 22, 2018

Related U.S. Application Data

(60) Provisional application No. 62/398,456, filed on Sep. 22, 2016.

(51) Int. Cl.
| | |
|---|---|
| A63F 9/24 | (2006.01) |
| A63F 13/00 | (2014.01) |
| G06F 17/00 | (2006.01) |
| G06F 19/00 | (2018.01) |
| G07F 17/32 | (2006.01) |
| G07F 17/34 | (2006.01) |
| G07F 17/42 | (2006.01) |
| G06Q 20/04 | (2012.01) |

(52) U.S. Cl.
CPC ......... *G07F 17/329* (2013.01); *G06Q 20/045* (2013.01); *G07F 17/323* (2013.01); *G07F 17/3204* (2013.01); *G07F 17/3213* (2013.01); *G07F 17/3218* (2013.01); *G07F 17/3223* (2013.01); *G07F 17/3227* (2013.01); *G07F 17/3239* (2013.01); *G07F 17/3244* (2013.01); *G07F 17/3255* (2013.01); *G07F 17/3286* (2013.01); *G07F 17/3288* (2013.01); *G07F 17/3293* (2013.01); *G07F 17/3295* (2013.01); *G07F 17/34* (2013.01); *G07F 17/42* (2013.01)

(58) Field of Classification Search
CPC ........ A63F 13/30; A63F 13/35; A63F 13/352; A63F 13/71; G07F 17/32
See application file for complete search history.

(56) References Cited

U.S. PATENT DOCUMENTS

| | | | |
|---|---|---|---|
| 8,419,532 | B2 | 4/2013 | Meyerhofer |
| 8,721,449 | B2 | 5/2014 | Johnson et al. |
| 9,564,010 | B2 | 7/2017 | Page et al. |
| 2012/0262735 | A1 | 10/2012 | Meyerhofer |

OTHER PUBLICATIONS

International Search Report and Written Opinion dated Jul. 7, 2017, PCT Application No. PCT/US2017/026717, 12 pages.

*Primary Examiner* — Kevin Y Kim
(74) *Attorney, Agent, or Firm* — Brownstein Hyatt Farber Schreck, LLP

(57) ABSTRACT

Devices, systems and methods are provided to enable casino operators to provide printed tangible items for patron uses, such as lottery tickets. Such embodiments accept tangible indicators of financial consideration from patrons, such as currency or tickets associated with certain verifiable values, such as valid and winning lottery tickets and other forms of consideration which a patron can provide to a casino in exchange for one or more points.

20 Claims, 7 Drawing Sheets

BILL VALIDATION AND CASH DISPENSING DEVICE, SYSTEM AND METHOD FOR USE IN A CASINO CONTEXT

CROSS-REFERENCE TO RELATED APPLICATION

This application claims the benefit under 35 U.S.C. § 119(e) of U.S. Provisional Patent Application No. 62/398,456, filed Sep. 22, 2016, and entitled "Bill Validation and Cash Dispensing Device, System and Method for Use in a Casino Context," the contents of which are incorporated by reference as if fully disclosed herein.

FIELD

The technology described herein relates to devices, systems, and methods for use in validating bills and other forms of tickets, dispensing cash and providing other related transactions using casino gaming systems and machines. The technology described herein also relates to backend systems for use in validating the recognition and awarding of credits, points, and other forms of digital currencies in a casino environment. The technology described herein also relates to the use of communications systems, devices, and methods for exchanging digital data between servers utilized in casino gaming environments, gaming machines, printers, validators, third party systems and servers and other components interconnected therewith.

BACKGROUND

The operations of casinos, gaming devices and gaming systems are typically tightly regulated by local, state and federal authorities. These regulations generally require a casino to maintain accurate records regarding every transaction that arises by, in or through the casino and to maintain positive levels of control over the currency transactions. For example, casinos commonly include gaming machines, such as slot machines, gaming tables or other devices, services or systems that are required by regulators to record every providing of cash thereto. Cash as used herein commonly and collectively refers to any form of financial consideration, such as currency bills issued by a governmental entity, bank credits, house credits, pre-paid accounts, such as those provided by PAYPAL™ and any other form of commonly recognized and transferable denominations of financial value. A casino patron typically exchanges cash to a casino in exchange for the opportunity of such patron (or others they may designate) to experience one or more games, products or other services provided directly or indirectly by the casino.

To facilitate the tracking and auditing of such transactions and the transfers of cash, casino system operators today often utilize point based "cards," such TITO ("ticket in, ticket out") cards. A TITO card essentially associates a given point value with a bearer of such card. The bearer may utilize known security techniques, such as pins and biometrics, to limit access and use of a TITO card. To use a TITO card, a patron will typically fund an account associated with the TITO card by exchanging cash for casino "points," where the casino points may be particular to and/or redeemable by and usable at a given casino or associated with respect to one or more designated casino(s) or other goods or services providers designated by or associated with a casino. Likewise, a patron may convert "points" into "cash" at the patron's request. The exchange of "cash" for "points" and vice versa may occur at booths, at gaming machines themselves, on-line or otherwise. Regardless of how such transactions occur, gaming regulations require a tracking of each point at each instance in a transaction flow including from the instance at which a point is generated (in exchange for cash), utilized (for example, with the playing of a slots game) and/or reconverted into cash or some other form of consideration provided to a patron.

Casino operators are also commonly required to comply with various tax laws and regulations, which often impose specific reporting requirements. Such reporting requirements often require the casino operator to generate and provide to a player various tax forms regarding a player's winnings. An operator must also report such tax forms to the taxing or other regulatory authority. For example, in the United States, the Internal Revenue Service ("IRS") requires an IRS form W-2G to be generated, provided to the player and reported to the IRS whenever a players' winnings from gambling activities exceed certain amounts, such as with some jackpots. Other tax forms may be required by the IRS, states, and other U.S. and non-U.S. government authorities. The generation of these tax and other forms today commonly requires the presence and assistance of a qualified casino employee at the location in the casino where the "winning" event occurred, e.g., the hitting of a slot machine jackpot by a player. The time during which such tax and other forms are generated commonly results in the gaming machine being out of commission. Accordingly, the generation of tax and other reporting forms is today a manual and time intensive endeavor for casino operators.

Typically, point tracking occurs at numerous points in a casino, including for example, in a master casino tracking system, in a slot management system (when slot machines are utilized for any given point), in TITO management systems, in Point of Sale Systems (such as those used by restaurants and retail stores located within or associated with a casino), in Property Management Systems (such as those used for lodging, recreation and similar casino related operations), at individual electronic gaming machines ("EGMs") and otherwise. Essentially, any device or system involved in the granting, redeeming, transfer, or use of points is typically required to track each point that such device or system "touches." Accordingly, these requirements impose a high layer of complexity and tracking on casino games and systems.

One approach for addressing these concerns has involved the use of Slot Machine Interface Boards ("SMIBs"). A SMIB commonly enables an EGM to communicate with one or more casino system servers over a network. Historically, SMIBs have provided limited functionality and limited connectivity between EGMs and other casino server systems. Common approaches often involve the use of legacy technologies, such as those that serially interconnect devices and systems using low bandwidth protocols which often do not allow data transmission rates exceeding the 19-20 Kbs range.

Further, when a dispute arises between any given EGM's accounting for a given credit and a backend system's accounting for such credit, the backend system typically will override the EGM's accounting. These architectural constraints, in turn, add to the complexity of operating casino systems and create inefficiencies and disputes, with such disputes often requiring the considerable time and attention of casino operators. Such disputes often may result in EGMs being inoperative for a given time while such disputes are being resolved thus impacting the patron's perception of the casino and the casino's bottom-line through reduced gameplay. Such systems commonly do not facilitate the providing of Internet and "app" type experiences most smart-phone and tablet computing device users have come to seek and expect.

Recently, systems have been developed which seek to provide greater functionalities in a gaming environment. One example of such a system is the Promotional Coupon System ("PCS") described in U.S. Pat. No. 8,419,532. Per this system, a PCS server is communicatively coupled to a game voucher printer capable of printing coupons targeted to a user of a given EGM. These types of systems, however, have been limited in the type of information capable of being communicated to an EGM for presentation to a patron thereof in a tangible form as well as in the presenting of options for additional services to such patron.

Likewise, today EGMs are typically connected to a bill validator type device. Such devices are commonly configured to accept currencies from a predetermined issuer thereof, such as the United States Treasury or another national governing body, determine the value of such predesignated currency, communicate such value to the EGM and to a casino management system which associate one or more points to the patron bearing a TITO or similar card. Commonly available bill validator systems, however, are not readily adaptable. For example, converting from US currency denominations to another government's currency denominations often requires manual reconfiguring of an EGM's firmware, or other computer code, and such bill validator systems commonly do not accept other forms of consideration or indicators of financial considerations, such as lottery tickets.

Thus, a need exists for devices, systems and methods which are adaptable, accountable, and manageable by casino operators in the providing of printed tangible items for patron uses, such as lottery tickets, W-2G tax forms, as well as the acceptance of tangible indicators of financial consideration from patrons, as provided for example in the forms of varying currencies, tickets associated with certain verifiable values, such as valid and winning lottery tickets and other forms of consideration which a patron can provide to a casino in exchange for one or more points.

BRIEF DESCRIPTION OF THE DRAWINGS

The features, aspects, advantages, functions, components, devices, systems, and methods provided by the various embodiments of the present disclosure are further disclosed herein with regard to at least one of the following descriptions and accompanying drawing figures.

DETAILED DESCRIPTION

The various embodiments described herein are directed to devices, systems and methods which are adaptable, accountable, and manageable by casino operators in the providing of printed tangible items for patron uses, such as lottery tickets, as well as the acceptance of tangible indicators of financial consideration from patrons, as provided for example in the forms of varying currencies, tickets associated with certain verifiable values, such as valid and winning lottery tickets and other forms of consideration which a patron can provide to a casino in exchange for one or more points.

Figure 1:
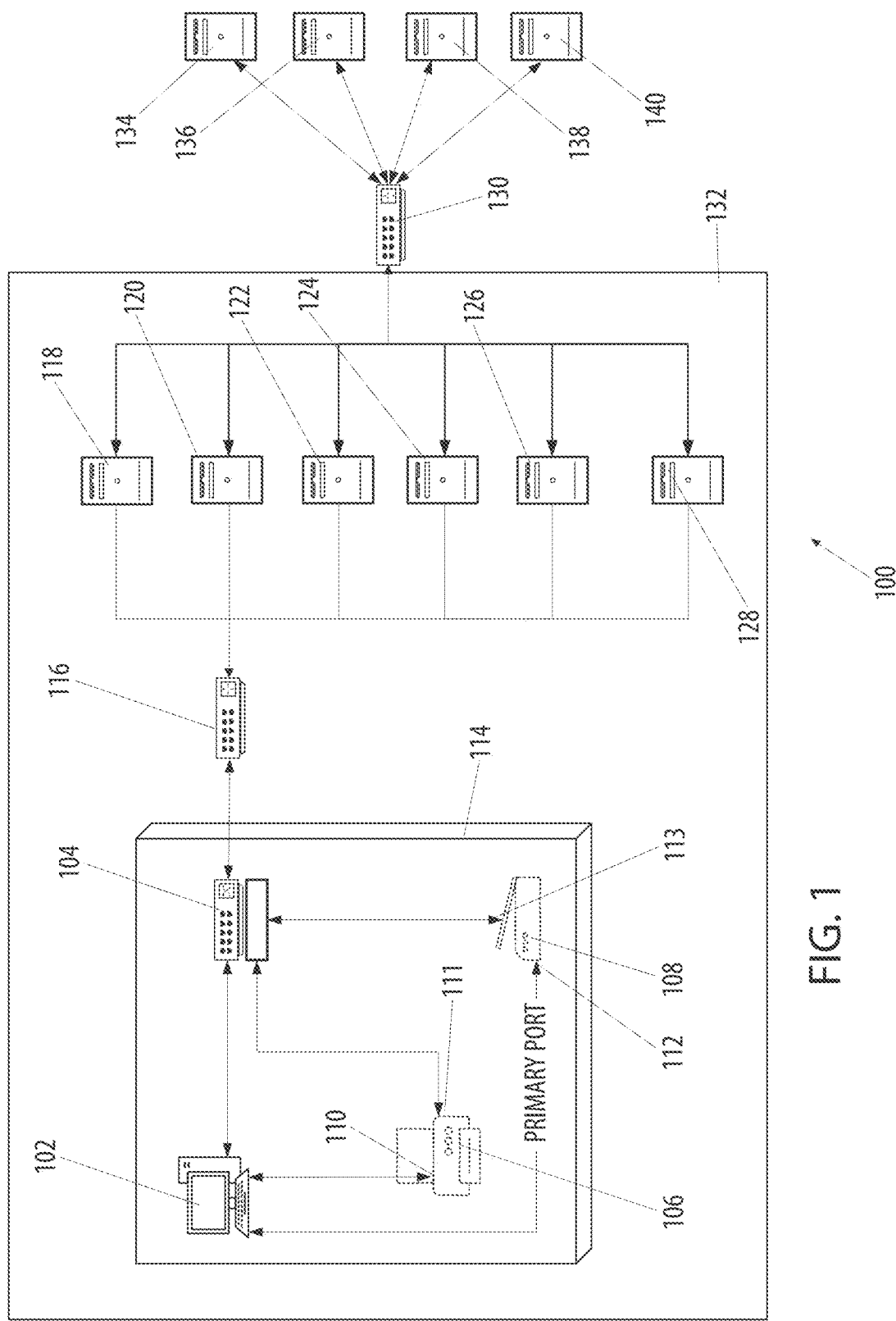
FIG. 1 is a schematic representation of a casino system configured for use in accordance with at least one embodiment of the present disclosure.

As shown in FIG. 1 and for at least one embodiment of the present disclosure, a system 100 disclosed herein includes an EGM 102 that is communicatively coupled to a peripheral controller 104 (such as a SMIB or similar device), a printer 106 and a validator 108. The EGM 102 is communicatively coupled to the printer 106 using a primary printer port 110 and to the validator 108 using a primary validator port 112. The peripheral controller 104 is communicatively coupled to the printer 106 using a secondary printer port 111 and to the validator 108 using a secondary validator port 113. In at least one embodiment, each of the EGM 102, peripheral controller 104, printer 106 and validator 108 are provided in a single gaming cabinet 114.

It is to be appreciated that the communications paths and/or linkages utilized to communicatively couple each of the EGM 102, peripheral controller 104, printer 106 and validator 108 to any other component or device may utilize any desired medium, such as copper wire, printed circuit boards, optical cables, wireless pathways or otherwise. In at least one embodiment, RS-232 compatible communication components are utilized to communicatively couple the EGM 102 to at least one of the peripheral controller 104, the printer 106, and the validator 108. In at least one embodiment, universal serial bus compatible communication components are utilized to communicatively couple the peripheral controller 104 with at least one of the printer 106 and the validator 108. In other embodiments, any known or hereafter developed communications components may be utilized to communicatively couple any of a first of the components of the gaming cabinet 114 with any one or more of a second of the components of the gaming cabinet 114. Further, in at least one embodiment, the communications components utilized to communicatively couple a printer 106 or a validator 108 to each of the EGM 102 and the peripheral controller 104 may utilize a single medium with the data signals communicated between such devices being separated, interleaved, addressed, or otherwise communicated. In short, any known or hereafter communications technologies may be used to communicatively couple one or more gaming cabinet 114 components with a second or more gaming cabinet 114 components. Such technologies may also be configured, as desired for any given embodiment, to facilitate the removal and replacement of any given gaming cabinet 114 components as such needs may arise, for example for repair, updating or otherwise.

It is also to be appreciated that while depicted in FIG. 1 or elsewhere in conjunction with the various embodiments described herein, the components of gaming cabinet 114 may be provided internal or external to the gaming cabinet 114 and may exist as any desired combination of hardware and software elements. It is to be appreciated that certain of such hardware and/or software elements may exist virtually and may utilize hardware and software components that may be utilized by another of the gaming cabinet 114 components.

Gaming cabinet 114 may be configured to include other components which are not shown in FIG. 1. Examples of such other components include but are not limited to TITO and similar card readers, dispensers of items, such as beverage dispensers, user interface components, mobile device interconnection components, such as BLUETOOTH™, WIFI, NCF, cellular, and other known and/or later to be discovered wire or wireless communications protocols, devices, and systems and otherwise. Such other devices may be communicatively coupled to one or more of the EGM 102, peripheral controller 104, printer 106, validator 108, and other devices such as a patron's smart-phone, as desired for any given implementation of one or more of the present embodiments.

EGM 102 may be configured to provide any desired patron/user experience. For example, in one embodiment EGM 102 may be a slot machine which provides several rotating elements, where upon the alignment of one or more of such elements, one or more prizes and/or awards are earned by the patron. In other embodiments, EGM 102 may involve any other form of game of chance, such as a video poker game, a turn-based game (such as MONOPOLY™) or any other game or user experience. In at least one embodiment, EGM 102 may not involve any aspect of a game of chance and instead may involve the participation in activities desired by a patron, such as, for example, the opportunity to participate in a singing competition, the opportunity to view a video event or otherwise. EGM 102 can provide any type of user desired interactive experience. EGM 102 may include any desired hardware and software components, the type, and capabilities of which are beyond the scope of the present disclosure.

Peripheral controller 104 may be configured to operate as a smart device with respect to one more components of the gaming cabinet 114, wherein the peripheral controller 104 itself executes one or more software/logical programs, controls and/or permits the operation of the printer 106 and/or validator 108 or otherwise attends to the operation of one or more functions provided by the system 100. In another embodiment, peripheral controller 104 may be configured to operate as a pass-through type device with respect to one or more components of the gaming cabinet 114, wherein the peripheral controller 104 essentially acts as a router or hub by which communications by and between gaming cabinet 114 components, such as EGM 102, printer 106 and validator 108, and external components are routed and directed. In yet another embodiment, the peripheral controller 104 may not physically exist in a gaming cabinet 114. Instead, those features and functions desired to be provided by the peripheral controller 104 in either the smart device or in the pass-through device configurations may be provided with respect to one more other gaming cabinet 114 components, as hardware, software or a combination thereof within an EGM 102, a printer 106, a validator 108, or other gaming cabinet 114 components. It is also to be appreciated that the hardware and/or software providing the features and functions of the peripheral controller 104 in either of the smart device and/or pass-through device configurations may be provided in other casino system 132 components, for example, as a virtual machine operating in the casino management system 118.

When configured in accordance with at least one embodiment of the present disclosure as a smart device, the peripheral controller 104 may be configured to be communicatively coupled, directly or indirectly to the Enhanced Services system 128, as described further below, so that the peripheral controller 104 has direct access to the various premium features, as discussed below, of the system 100. In furtherance of such a system configuration, the peripheral controller 104 may be configured with one or more drivers and/or application program interfaces which enable the peripheral controller 104 to control one or more features and functions of one or more of the printer 106 and the validator 108.

When configured in accordance with at least one embodiment of the present disclosure as a pass-through device, peripheral controller 104 may be configured to enable the Enhanced Services system 128 to communicate with and control the operation of at least one of the printer 106 and the validator 108. In accordance with at least one embodiment, such control of the printer 106 and/or the validator 108 may utilize the secondary printer port 111 and the secondary validator port 113, respectively. As configured as a pass-through device, the peripheral controller 104 may be further configured to pass data messages between the Enhanced Services system 128 and one or more of the printer 106 and validator 108. It is also to be appreciated that a casino system 132 may include two or more gaming cabinets 114, with each of such gaming cabinets having the same or different components thereof. As such, a first gaming cabinet may utilize a peripheral controller in smart-device mode of operation, while a second gaming cabinet may utilize a second peripheral controller in a pass-through mode of operation, while a third gaming cabinet may provide the features and functions of a peripheral controller in an EGM itself. Further, it is to be appreciated that a peripheral controller may be configured, in accordance with at least one embodiment, to provide a first mode of operation, i.e., smart device, pass-through or non-existent, at a first instance in time or with respect to a first gaming cabinet component, while being configurable to operate in accordance with a second mode of operation at a second instance in time or with respect to a second gaming cabinet component.

The Enhanced Services system 128 may be configured to support any desired level of tax, regulatory, or other reporting and compliance requirements (collectively, "tax reporting requirements"). It is to be appreciated that tax reporting requirements may vary by authority, type of game played, player nationalities, where game played, and otherwise. The Enhanced Services system 128 may be configured to account for such variances in tax reporting requirements based on player or any other factor. The Enhanced Services system 128 may be configured to interface with printer 106, validator 108, EGM 102, player's mobile devices, other casino system servers and third-party servers, including but not limited to those provided by the IRS and other governmental and/or other bodies, to facilitate and support any such tax reporting requirements. For example, when preparing a U.S. I.R.S. W-2G form for presentation to a player, the system 100 may be configured to utilize a player database provided by a casino system server, such as a casino management server 118 to obtain information regarding a player. Such information may include social security, address, state of residence, nationality, citizenship/residency status and any other information needed to prepare and present the form, such as a W-2G form, to the player.

Printer 106 may be configured to operate in accordance with one or more system protocols. Such protocols may be configured, for example, to govern when a printer can and cannot be utilized. One or more embodiments of such system protocols are discussed below. Printer 106 may also be configured to print or otherwise produce for access by a patron any desired tangible item. In at least one embodiment, such a tangible item is a "ticket", such as a lottery ticket, a movie ticket, a coupon, or the like. In another embodiment, a "ticket" may include a W-2G or other document necessitated by one or more tax reporting requirements. Such tickets may be "printed" on paper, plastic or any other substrate. The printing of such a "ticket" may include the implantation or coding of electromagnetic, optical, radio frequency, humanly perceptible, combinations thereof and/or other forms of information conveyances. For example, a "ticket" may include one or more electrical devices and/or structures into which data can be stored and later accessed by other systems having compatible readers. Examples of such data storage and productions systems include but are not limited to Radio-Frequency identification (RFID) tags and other tags. Printer 106 may also be configured to print other, non-ticket type items, such as via the use of 3D printing technologies. It is to be appreciated that one or more such "tickets" may also be "printed" virtually, such as by providing and electronic file transfer of a suitable formatted and completed ticket to a player's or other entities' designated storage device. For example, tickets required by one or more tax reporting requirements may be virtually printed to one or more of a casino system's data storage devices, to an IRS communicatively coupled server, and to a player's designated storage device, such as a data storage location on a player's smartphone or like device, onto a flash drive, into a cloud storage location, such as those provided by BOX, DROPBOX, GOOGLE Docs and others, or otherwise.

In accordance with at least one embodiment, printer 106 may be configured to utilize one or more templates when printing tickets. For examples, a printer may be configured with templates for W-2G forms and other forms necessitated by one or more tax reporting requirements. Information utilized to populate a given form may be obtained from any communicatively coupled system or server, such as a casino management server 118 or a third party server. Such templates may be preloaded onto a printer 106, provided real-time by an Enhanced Services system 128 server, the Enhanced Services system 128 server being discussed in further detail below, bulk downloaded or otherwise made available for use by a given printer 106. It is to be appreciated that the templates utilized and tickets printed in accordance with such templates may be standardized or customized for one or more printers, casino systems, type of tickets or otherwise. At least one embodiment includes the use of a printer 106 whose operating software and other routines and/or functions provided by printer 106 may be upgraded and/or downloaded from a casino system 132 server, such as Enhanced Services system 128 server. A printer 106 may be identified by a unique identifier, such as a network address, a device hardware identifier, a unique sequence of numbers, by a group, such as a grouping of two or more printers in a casino system 132, or otherwise. A printer 106 may be configured to accumulate, monitor, and provide various metrics about printer usage including, for example, usage data, type of tickets generated, health, toner or similar ink status, paper status or other parameters commonly used to monitor printers in casino systems.

Validator 108 may be configured to operate in accordance with one or more system protocols. Such protocols may be configured, for example, to govern when a validator can and cannot be utilized. One or more embodiments of such system protocols are discussed below. Validator 108 may be configured to detect the presence of any desired form of "ticket" or other provisioning of data. In at least one embodiment, validator 108 may be configured to receive information printed onto a ticket using known techniques. By way of illustration only and not by means of limitation, examples of such techniques include two-dimensional bar codes, QR codes, data matrices, digital paper codes, visible and invisible watermarks, magnetically encoded information and otherwise. In at least one embodiment, validator 108 may be configured to receive other forms of information provided on "tickets" such as a patron's signature, a code or other identifier provided by a patron. Validator 108 may be configured to include optical character recognition capabilities, pattern recognition capabilities and other forms of signal and character processing technologies. Validator 108 may be configured to receive data communicated by means of electrical, optical and/or radio frequency signals, such as near field communication (NFC) signals, Wi-Fi signals, and using other known technologies. It is to be appreciated that any known device may provide such data. Examples of such devices include RFID tags, smart phone systems and others. Validator 108 may be configured to determine, based on the origin and/or type of information received from a given ticket or device providing the same, where such information is to be communicated. For example, in accordance with at least one embodiment, the insertion of a currency into validator 108, validator 108 may be configured to verify the authenticity of such currency and, when authentic, communicate the issuing authority, amount, and any other desired information to EGM 102.

In accordance with at least one embodiment, validator 108 may be configured to include one or more premium features. Such configurations may be managed using an Enhanced Services system 128 server, a casino management system 118 having Enhanced Services system 128 capabilities or otherwise. In accordance with at least one embodiment, a premium feature provided by a validator 108 may include the capability to receive, validate and accept currencies provided in multiple currencies, and communicate to the casino management system 118 the issuing authority and type, e.g., U.S. dollars versus British Pounds Sterling, and the value of the currencies received. The validator 108 separately, or in conjunction with the Enhanced Services system 128 and/or the casino management system 120, may be configured to customize the currency exchange rates utilized, prizes awarded as based upon a desired currency, provide currency conversions with or without a markup and other financial transactions. The validator 108 and system 100 may also be configured to consider differences in currency exchange rates, a player's native currency (i.e., the primary currency utilized where they reside), the amount won in the currency local to the casino and other factors in determining amounts to record and/or report in compliance with one or more tax reporting requirements. It is to be appreciated that the features provided may be standardized or customized for one or more validators, casino systems, type of currencies received or otherwise. Validators may also be customized to receive and recognize one or more tickets, such as lottery tickets, coupons, cashier's checks, or otherwise. Such customization may occur under the direction and direct or indirect control of an Enhanced Services system 128 server, a casino management system server 118, a combination of the foregoing or otherwise. At least one embodiment includes the use of a validator 108 whose operating software and other routines and/or functions provided by validator 108 may be upgraded and/or downloaded from a casino system 132 server, such as Enhanced Services system server 128. A validator 108 may be identified by a unique identifier, such as a network address, a device hardware identifier, unique sequence of numbers, by a group, such as a grouping of two or more validators 108 in a casino system 132, or otherwise. A validator 108 may be configured to accumulate, monitor, and provide various metrics about validator usage including, for example, usage data, type of tickets received, types of currencies received, device health, status, or other parameters commonly used to monitor validators in casino systems. For at least one embodiment, validator 108 may be configured to provide back-tracing capabilities which enable a casino operator using, for example, an Enhanced Services system server 128 and/or a casino management system 118 server, to obtain banknote signatures, serial number optical character recognition (OCR) and for back-tracing an inserted banknote to a specific player. In accordance with such an embodiment, casino system 132 may be utilized to monitor and deter the use of forged currencies and other illicit negotiable instruments.

In accordance with at least one embodiment, validator 108 may be configured to include an Image Correction and Enhancement (ICE) component. The ICE component may be configured to provide for advanced character recognition capabilities that may be uniquely associated with unique and/or generic brands of validators, such as the iVIZION validator provided by Japan Cash Machine Co., Ltd.

Peripheral controller 104 is communicatively coupled to a first network 116. In accordance with at least one embodiment, the first network 116 may be utilized exclusively by the casino such that it is physically closed, logically closed, such as by firewalls and closed data ports, or otherwise sealed partially to wholly to the transmission and/or reception of external data communications. The first network 116 may utilize any known or later arising networking technology. The first network 116 may include and utilize local area networks, wide area networks, the Internet, or any other communications configuration, topologies, mediums, protocols, and technologies.

The first network 116 communicatively interconnects one or more servers, databases, devices and/or systems utilized by a casino for its operations, accounting, reporting, marketing, management, sales and otherwise. Examples of such servers include casino management system 118, casino management system 120, TITO system 122, property management system 124, point of sale system 126 and Enhanced Services system 128.

It is to be appreciated that the storage and/or communication of data by and between any of the components of system 100 may be encrypted. Any desired single or combination of encryption technologies may be utilized by system 100 components, including but not limited to the use of secure socket layers, virtual private networking, public/private keys, 256-bit encryption algorithms or other known or later arising encryption algorithms, techniques and technologies.

It is also to be appreciated that in accordance with at least one embodiment, any two or more of the networked system components, such as the casino management system 118 server and the Enhanced Services system 128 server may be logically, physically, or virtually directly communicatively coupled. Such couplings may include the use of one or more application program interfaces (APIs), such that API calls between any two given server components may be utilized to authorize, access, control or otherwise manage one or more premium services provided by the system.

As further shown in FIG. 1 for at least one embodiment, the system 100 may include the use of one or more second networks 130. Such second networks 130 may utilize any desired data communication technologies, protocols, mediums, and topologies. In accordance with at least one embodiment, the second network 130 is the Internet. The second network 130 may be configured to communicatively connect the casino system 130 with one or more third party systems, as represented by one or more third party servers, such as lottery server 134, pari-mutual server 136, marketing server 138, and fantasy sports server 140. The second network 130 may also be configured to communicatively connect the casino system 130 with servers operated by the IRS and other entities and in accordance with one or more tax reporting requirements. It is to be appreciated that the services provided by one or more of such third-party systems and servers may be provided by the casino system 132 as a premium feature to a patron using an EMG 102.

Figure 2:
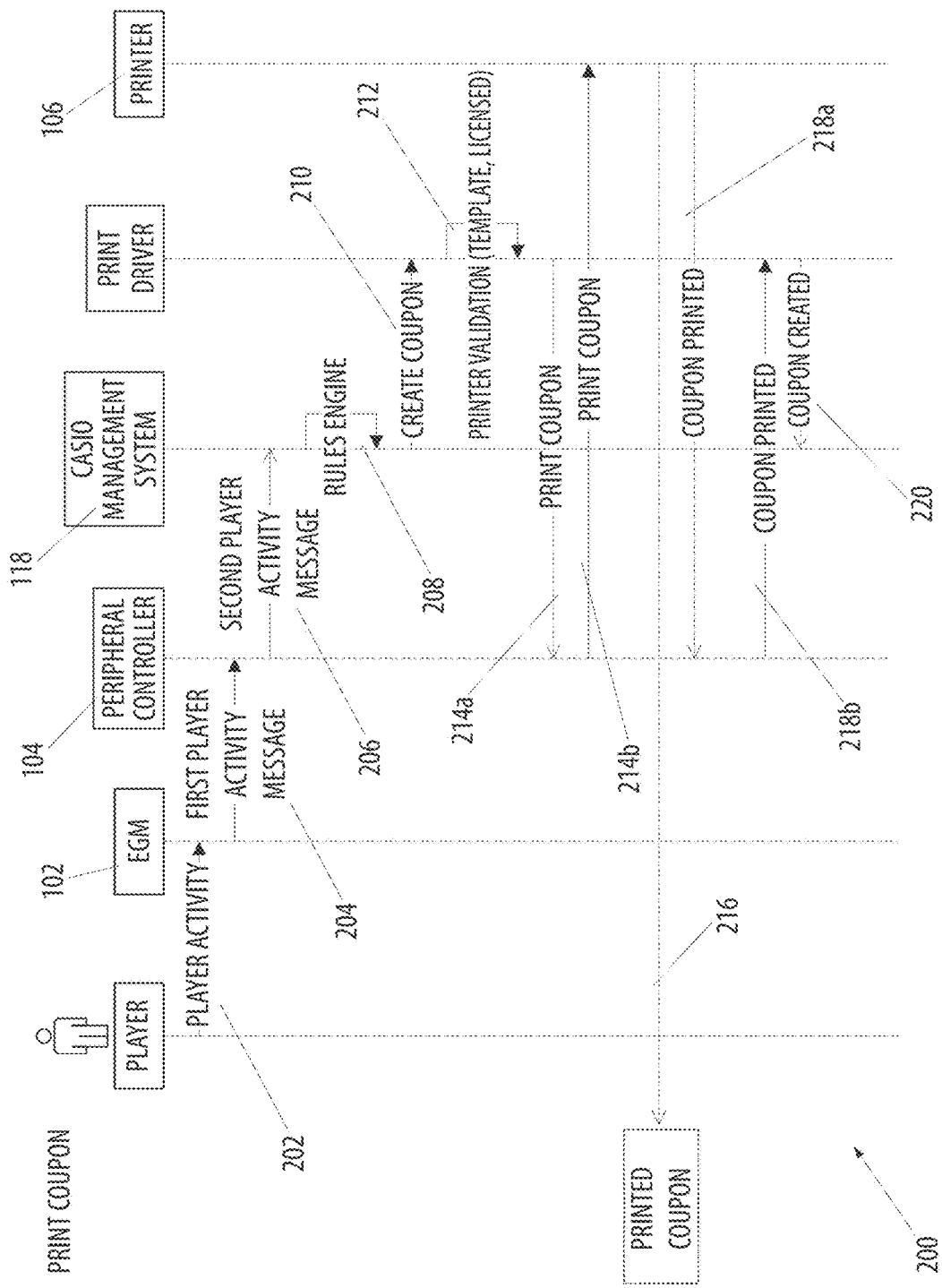
FIG. 2 is a sequence diagram illustrating a print sequence implemented in accordance with at least one embodiment of the present disclosure.

Referring now to FIG. 2, in accordance with at least one embodiment of the present disclosure, a sequence 200 for printing of a ticket, such as a coupon, by printer 106 is shown. This sequence generally begins at Operation 202 with a patron (a "player") interacting with the EGM 102. For example, a player may request the printing of a coupon offered to them for printing at the gaming cabinet 114 or otherwise.

In Operation 204, when a peripheral controller 104 is present in the system 100, in either a smart-device or pass-through configuration, the player's request is processed by the EGM 102 into a first player activity message. The first player activity message is configured for communication to the peripheral controller 104 over a pre-existing communications path connecting the EGM 102 to the peripheral controller 104. It is to be appreciated that the first player activity message and any other messages utilized by the system 100 may be sent encrypted or in the clear, compressed or uncompressed, or in accordance with any data transmission protocols utilized by a given gaming system and/or a gaming cabinet. When a peripheral controller 104 is not present in the gaming cabinet, Operation 204 is bypassed and the process continues with Operation 206.

In Operation 206, a second player activity message is communicated from the peripheral controller 104 (when present in a given gaming cabinet 114) or by the EGM 102 (when the EGM 102 connects directly to the first network 116), over the first network 116 to the casino management system 118.

In Operation 208, upon receipt of the second player activity message, the casino management system 118 executes one or more rules engines. These rules engines may provide for any desired processing and rewarding, or denying, of coupon requests. For example, a rules engine, in response to a player request for a drink coupon, may be configured to award the coupon based upon any parameter, such as amount wagered, player characteristics, floor (in) activity or any other parameter. Based upon the determinations of the rules engine, the casino management system 118 may deny, approve a modified coupon (perhaps one with a discount or percentage off on a drink), or approve the player's request.

In Operation 210, when a player request is awarded in whole or in part, the casino management system 118 generates a create coupon message 210. This message 210 is communicated by the casino management system 118 to the Enhanced Services system 128 server over one or more of the above described networks. It is to be appreciated that when the casino management system 118 and the Enhanced Services system 128 functionalities are provided by virtually distinct, rather than physically distinct, servers messaging between such virtual devices may occur without utilizing the first network 116. Additionally, and often depending on the type of gameplay and/or amount and type of coupon or other consideration awarded by a casino to a player, additional tickets may be generated and/or printed. Such tickets may include those necessary to comply with one or more tax reporting requirements.

In Operation 212, a printer validation operation is performed by either the printer driver provided in a peripheral controller 104 configured as a smart-device, or by the Enhanced Services system server 128 when either the peripheral controller 104 is configured as a pass-through device or the peripheral controller 104 is not utilized in a gaming cabinet 114. This printer validation operation is described in greater detail below for at least one embodiment in conjunction with the process flow shown in FIG. 3. In essence, the printer validation operation 212 confirms that a given printer 106 is both properly configured, for example, with the desired template, and is licensed by the Enhanced Services system 128 server. When the printer 106 is verified as being licensed and configured as desired for a given print request, the process continues with Operation 214.

In Operation 214a and 214b, a print coupon message is communicated from the print driver in the validating device (such as the peripheral controller 104 or the Enhanced Services system 128 server) to the printer 106. It is to be appreciated that when the peripheral controller 104 is providing the print driver functionalities, Operation 214a is not executed and the process proceeds only with Operation 214b being executed. Contrarily, when the Enhanced Services system 128 server is providing the print driver functionalities, Operations 214a and 214b are both executed with either the peripheral controller 104 or the EGM 102 operating as a receive and forward, i.e., pass-through, device.

Upon receiving the print coupon message, the printer 106 executes the command and prints the approved and validated coupon, as per Operation 216. For at least one embodiment printer 106 may be configured to monitor the quality of a printing or may be configured to permit re-printing of a coupon or other ticket, as based upon player request or otherwise. Once the printing of a ticket is complete, the process continues with Operation 218.

In Operations 218a and 218b, the printer 106 communicates with the print driver that the coupon has been communicated. As per above, the communication of messages 218a and 218b depend upon which system component is providing the print driving capabilities. When such functions are provided by the peripheral controller 104, message 218b is not communicated. Contrarily, when such functions are provided by the Enhanced Services system 128 server, both messages 218a and 218b are communicated by and between the peripheral controller 104 (if one is present) and the Enhanced Services system 128 server.

In Operation 220, the print driver completes this sequence by communicating a second coupon created message to the casino management system 118 server which processes such message in accordance with other casino system protocols.

Additionally, the printer 106 may be configured to require a validation by a player when certain tickets are printed. Such player validation may be needed for the casino to document its compliance with one or more tax reporting requirements, such as the providing of a player with a W-2G form when appropriate. Such validation may occur by use of the validator or otherwise.

Figure 3:
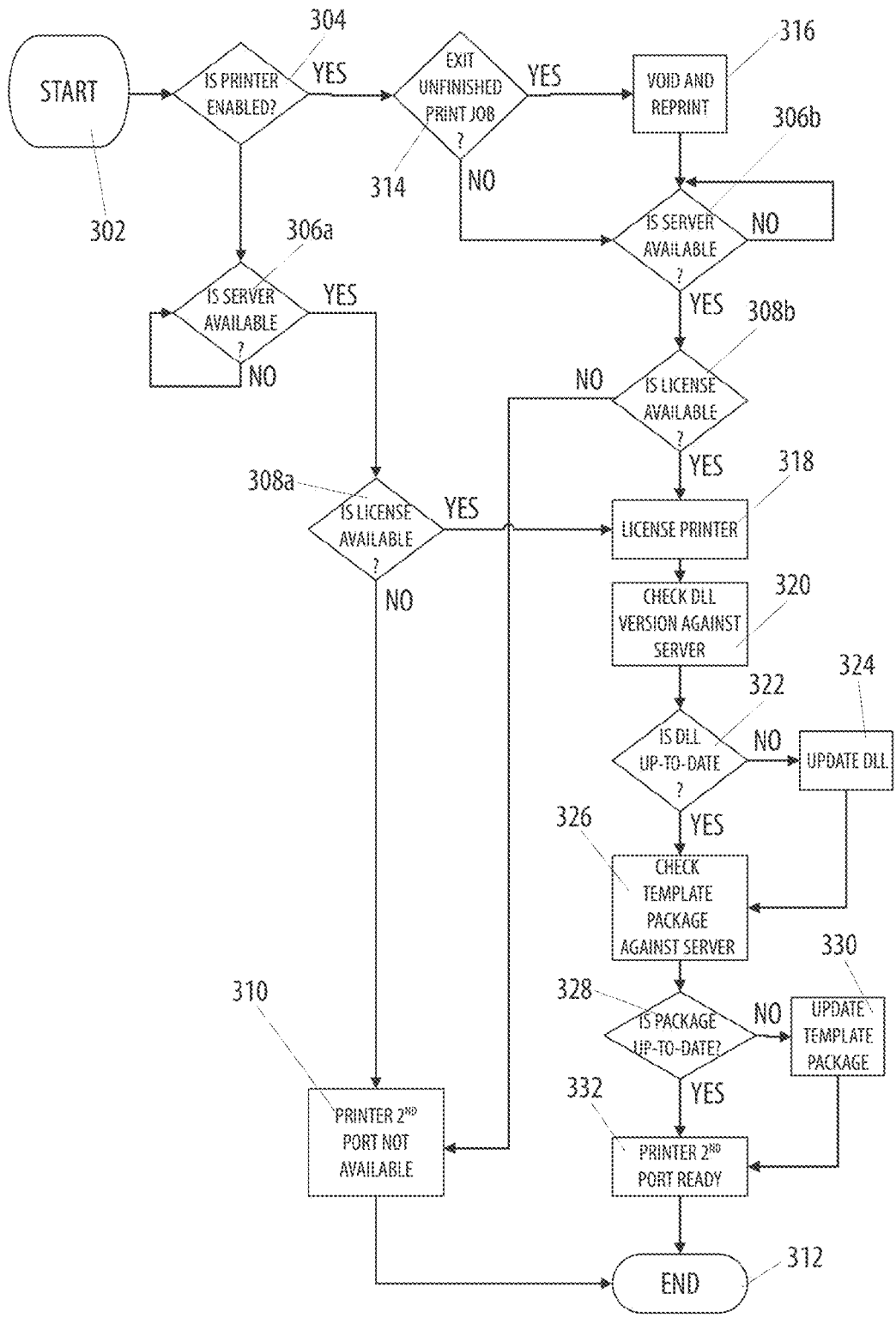
FIG. 3 is a flow chart illustrating a process by which a printer is validated by a print driver in accordance with at least one embodiment of the present disclosure.

Referring now to FIG. 3, in accordance with at least one embodiment of the present disclosure, a printer validation process is shown. As discussed above, one mechanism by which this process is initiated (as per Operation 302) is upon a printer driver receiving a request to print a ticket, such as a coupon, from a casino management system 118 server. Other scenarios in which this process may be implemented include on a periodic basis, such as a regular verification may occur between an Enhanced Services system 128 server and a printer 106, that such printer is properly configured and licensed to provide printing services, including basic services such as the printing of a coupon and premium services, such as the printing of a lottery ticket or otherwise.

As used herein, a premium printing service is defined to be a printing service provided in conjunction with the use of a printer 104 in a gaming cabinet 114 or otherwise in a casino that is provided in accordance with at least one embodiment of the present disclosure and which uses one or more features or functions of an Enhanced Services system server (which may be embodied as an application residing on another server) and results in a transfer to a patron or player of a printed ticket, such as a lottery ticket, that is redeemable by at least one third party operated system. As further used herein, a basic printing service is defined to be a printing service provided in conjunction with the use of a printer 104 in a gaming cabinet 114 or otherwise in a casino that is provided in accordance with at least one embodiment of the present disclosure and which does not require the use of one or more of the features and functions of an Enhanced Services system server or application and results in a transfer to a patron or player of a printed ticket, such as a drink coupon, that is redeemable only by use of a casino property that is owned, operated, co-located or otherwise affiliated with a casino to provide certain goods and services such as food, retail, lodging and entertainment goods and services. It is to be appreciated that for at least one embodiment, basic printing services may include the generation of "tickets" compliant with one or more tax reporting requirements.

Once initiated, the process continues with a determination of whether the given printer is enabled (Operation 304). It is to be appreciated that this Operation 304 may occur on a requested basis or periodically. Status checks and other known techniques for verifying the operational status of a connected device may be used in accordance with this Operation 304. It is to be appreciated that this determination of whether the printer 106 is enabled may be accomplished by the print driver as provided by either the peripheral controller 104, when configured in the smart device mode, or the Enhanced Services system 128 server when the peripheral controller 104 is either configured in the pass-through mode or is not included in the gaming cabinet 114.

If the printer is not enabled, the process flow continues for at least one embodiment of the present disclosure with the "no" option and Operation 306a. In Operation 306a, a determination is made as to whether the Enhanced Services system 128 server is available. It is to be appreciated that, for at least one embodiment, this operation of verifying whether the Enhanced Services system 128 server is available occurs regardless of the configuration and/or presence of the peripheral controller 104. For at least one embodiment, the Enhanced Services system 128 server is the device provided in system 100 for granting, verifying, refreshing and revoking licenses for printers 106 and validators 108. Per Operation 306a, the determination of whether the Enhanced Services system 128 server is available continues until the server is available or a time-out or other type of interrupt event (not shown) occurs.

When the system 128 server is available, the process continues in Operation 308a with a determination as to whether a license is available for use by the requested printer. In accordance with at least one embodiment, the Enhanced Services system 128 server may be configured to determine whether a license is available for a given printer based on any number of factors, including for example, the number of licensed printers used with the system 100, the performance history (for example, number of jams) for a given printer, the version of the printer, whether the printer's firmware is current or dated, the number of print job requested by an EGM, such as over the primary port, or by other system components, such as via a secondary or other port, the dynamic linked library (DLL) version being used by the printer, the printer device state, and any other desired parameter or metric.

If it is determined that a license is not available for the requested printer, the process continues in Operation 310 with designating, flagging, virtually connecting or other disabling the secondary printer port 111 on the printer 106. It is to be appreciated that the disabling of the secondary printer port 111 may not affect the use of the printer in accordance with the primary printer port 110. That is, the EGM 102 may use the printer 106 for routine and/or basic print jobs managed directly by the EGM itself. After the secondary printer port 111 is disabled, the process ends (as per Operation 312).

Referring again to Operation 304, for at least one embodiment, when it is determined that the printer 106 is enabled, the process continues along the "yes" path to Operation 314. In Operation 314, a determination is made as to whether the printer 106 is currently being used. This determination may arise, for example, in a scenario where the EGM 102 is communicating with the printer using the primary printer port 110, while the Enhanced Services system 128 server or the peripheral controller 104 is seeking to use the printer via messages communicated over the secondary printer port 111. If the printer 106 is busy and an unfinished print job needs to be exited, the process continues with Operation 316 where the existing print job is voided and a reprint job is initiated. It is to be appreciated that for at least one embodiment, this void and reprint process places a priority on print jobs communicated to a printer 106 via the secondary printer port 111 over print jobs communicated to the printer from the EMG 102 via the primary printer port 110. The process then continues with Operation 306b.

As per the "no" path flowing from Operation 314, if the printer 106 is not engaged in an unfinished print job, the process continues with Operations 306b and 308b.

For at least one embodiment of the present disclosure, Operations 306b and 308b function respectively the same as Operations 306a and 308a.

In Operations 308a and 308b, when it is determined that a license is available for the printer 106, the process continues with Operation 318 and the licensing of the printer. In accordance with at least one embodiment, the licensing of the printer 106 by the Enhanced Services system 128 server entails an exchange of a "token." For at least one embodiment, the token is an encrypted data packet that includes a data packet revision number, a device type, a customer ID, an enable feature ID, an enable duration (which may vary by feature and may be specified in a number of days, a number of uses or otherwise), a number of installations permitted under a single license, a number of users permitted, a number of offline prints permitted, a duration of offline prints permitted and any other desired parameter. It is to be appreciated that other parameters may be utilized in a token in accordance with other embodiments of the present disclosure. For example, in one embodiment a license token may include the following fields shown in Table 1 below.

TABLE 1

| Field | Size | Initial value | Description |
| --- | --- | --- | --- |
| License ID | 4-bytes | [XX XX XX XX] | Uniquely identifies this license to the JCM Licensing System |
| License Key Edition | 2-bytes | [00 00] | Indicates the license key format |
| License Features | 4-bytes | [00 00 00 00] | Reserved to include information enabling special features (0 initially) |
| Random Data | 8-bytes | [XX XX XX XX] | To increase randomness of the license. |
| CRC | 2-bytes | [XX XX] | CRC of the prior Bytes |

Referring again to FIG. 3, once the printer 106 is licensed, the process continues in Operations 320, and 322 with checking whether the DLL version on the printer is the same as the DLL version stored on the server. If the versions are not the same, in Operation 324, a download is communicated from the Enhanced Services system 128 server to the printer 106 and the DLL on the printer is updated.

In Operations 326, and 328, the process continues with a determination as to whether the template package to be used by the printer 106 to print the requested ticket is current. If the package is not current, the process continues with Operation 330 and the template package on the printer 106 is updated. It is to be appreciated that Operations 326, 328, 330 and the update of template packages may be flagged for execution in part presently, such as with respect to only the template then needed by the printer to print the requested coupon, and for execution later of any remaining templates that are not present or are otherwise out of date, deficient, defective, or are to be added, amended, or deleted. The process then continues with Operation 332.

In Operation 332, the printer 106 designated as being ready to process print requests communicated to the printer 106 via the secondary printer port 111 at which instance the process ends in Operation 312.

Figure 4:
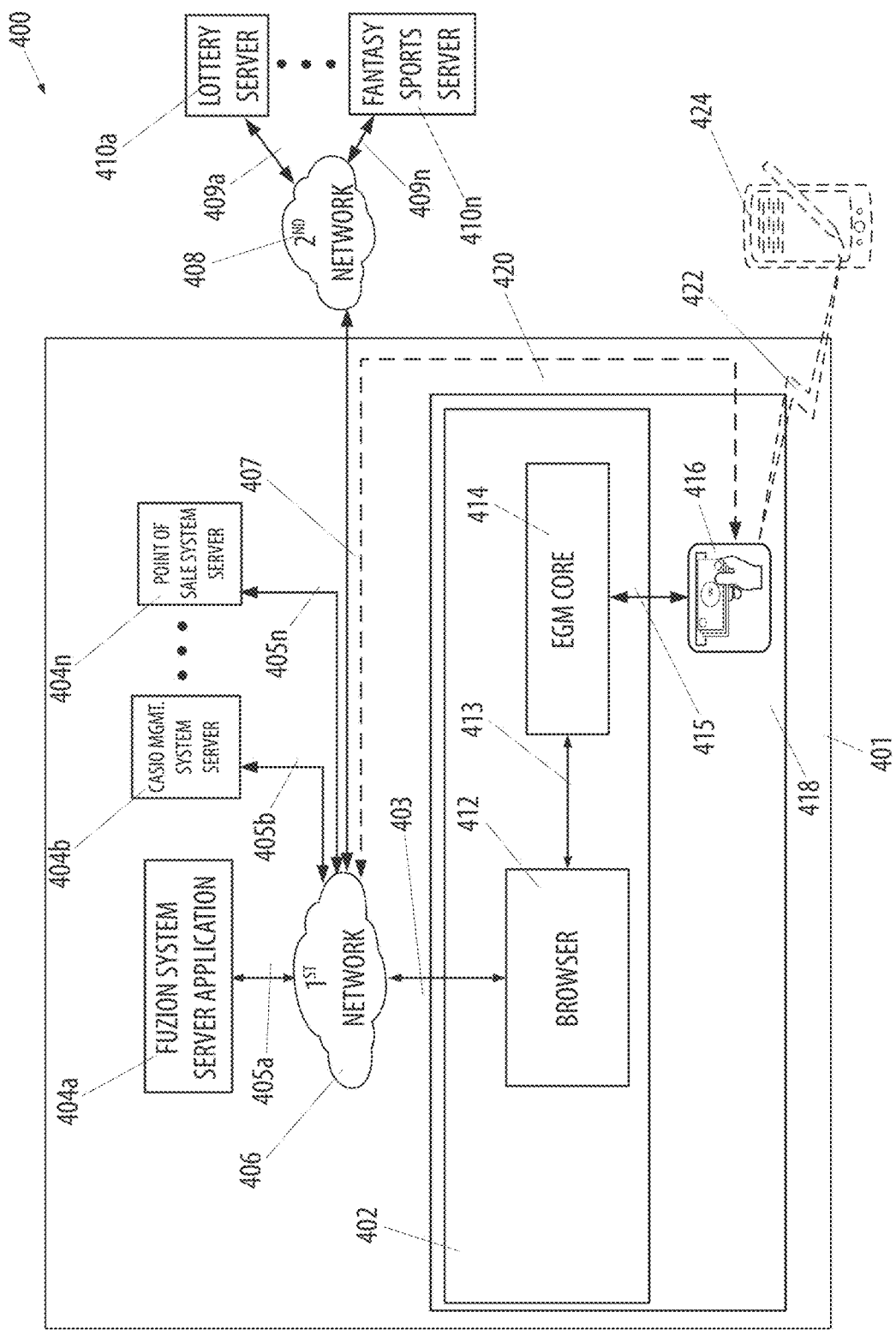
FIG. 4 is a schematic representation of a casino system configured for use with an electronic gaming machine ("EGM") configured to communicate with one or more casino system servers using Ethernet and comparable networking technologies in accordance with at least one embodiment of the present disclosure.

As shown in FIG. 4 and in accordance with at least one embodiment of the present disclosure, a schematic representation of system 400 is depicted wherein a casino system 401 includes at least one EGM 402 configured to communicate directly, i.e., with the use of a peripheral controller (not shown) or indirectly, i.e., with the use of a peripheral controller, with one or more casino system 402 servers 404a-404n over at least one of a plurality of respective first and second data connections 403 and 405a-405n using a first network 406. The system 400 may further include one or more communications mediums 407 which may be used to communicatively couple casino system 401 components, via the first network 406, and a second network 408. In at least one embodiment, the second network 408 and the third-party components 410a-n connected thereto are logically remote and in many cases physically reside at locations external to the logical and physical locations of casino system 401 components. One or more third party servers, systems or devices may be connected permanently, temporarily or on an ad-hoc basis to the second network 408 and thereby to the first network 406 and thereby to one or more components of the casino system 401. Examples of third party servers, systems and/or devices which may be used to communicatively connect to the second network 408 and with respect to which one or more components of the casino system 401 may be communicatively coupled include, but are not limited to, third party servers 410a-410n, such as lottery server 410a and fantasy sports server 410n.

Each of the first network 406 and the second network 408 may use any known or later arising networking technologies, topologies, communications mediums, protocols, and the like to establish and facilitate the interchange of data between two or more components. In accordance with at least one embodiment, the first network 406 is an Ethernet type network and the second network 408 is the Internet. Each of these networks 406 and 408 and the respective first, second and third data connections 403, 405a-n, and 409a-n provided therebetween may utilize any known or later arising communications technologies, mediums, standards, protocols, devices, systems, and the like. In at least one embodiment, first data connection 403 utilizes one or more wireless communications technologies, such as Wi-Fi, and Bluetooth while respective second and third data connections 405a-n and 409a-n utilize wired communications technologies.

As further shown in FIG. 4 the EGM 402 includes a browser component 412 that is communicatively coupled, for example, using an EGM system bus 413, to an EGM core 414. The EGM core 414 is communicatively coupled using fourth data connection 415 to a validator 416. As shown for the embodiment depicted in FIG. 4, the EGM 402 and validator 416 may both be physically located in a single gaming cabinet 418. In other embodiments, the validator 416 may be provided separately from the EGM 402.

In accordance with at least one embodiment, the validator 416 may be communicatively coupled to the first network 406 and the components of the casino system 401 using a separate, and fifth data connection 420.

In accordance with at least one embodiment, the validator 416 may be communicatively connected via an optional sixth data connection 422 with a player's personal device 424. While not shown in FIG. 4, it is to be appreciated that the player's personal device 424 may be communicatively coupled to one or more components connected to the first network 406, such as casino management system server 404b, and/or to one or more components connected to the second network 408, using any known wireless communications technologies.

In accordance with at least one embodiment wherein the EGM is configured to communicate directly with one or more casino system servers 404a-n, the EGM core 414 may be configured to provide the device driver functionalities described above as being provided by the peripheral controller and/or by the Enhanced Services system server 404a. Such functionalities include, but are not limited to, licensing of a given validator, health monitoring, metrics monitoring, currency exchange setting management and other functions. It is to be appreciated that validator 416 may be configured to communicate with such an EGM core using a second data port, such as the secondary validator port 113 discussed above with respect to the embodiment of FIG. 1. Likewise, validator 416 may be configured to communicate with the EGM 402 with respect to the providing of other, non-premium services, such as those commonly provided by EGMs that are not communicatively connected to an Enhanced Services system server 404 or a server providing one or more features and functions provided by an Enhanced Services system server 404 as discussed herein with respect to one or more of the embodiments of the present disclosure.

As depicted by the dashed (indicating optional) lines of the fifth data connection 420, it is to be appreciated that for at least one embodiment, a validator 416 may be configured to provide premium services by communicatively coupling, via for example the first network, directly with one or more casino system servers 404a-n, where "directly" here means that the premium feature data signals used to provide premium features and functions at a given validator 416 proceed by use of a data connection that is not routed by or through an EGM 402 or a peripheral controller (not shown in FIG. 4). It is to be appreciated that such an embodiment enables the use of validators 416 capable of providing premium features even when an EGM 402 and/or a peripheral controller is not configured to support or is not capable of supporting the providing of such premium features and functions by a given validator 416.

Figure 5:
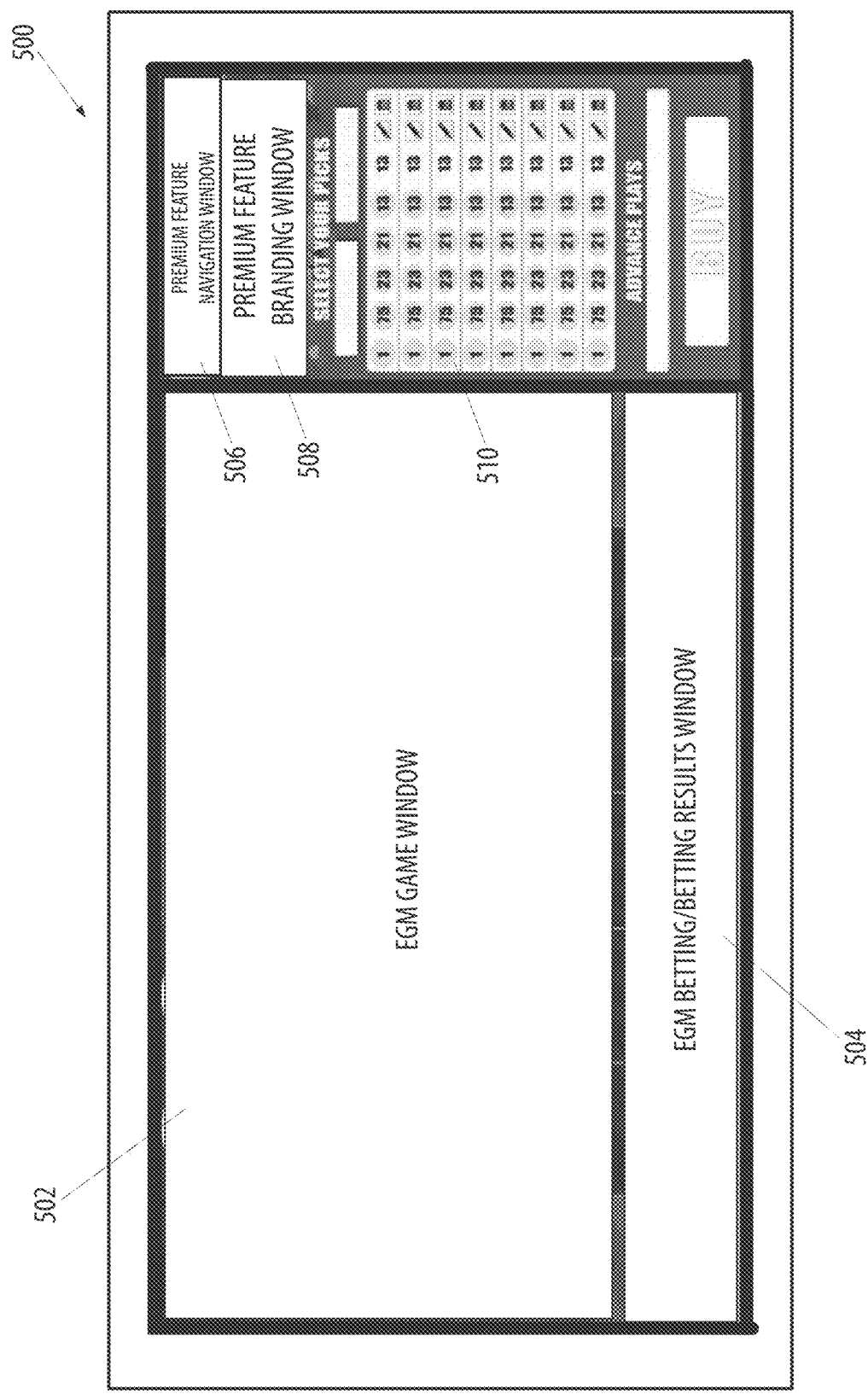
FIG. 5 is a pictorial representation of a visual display providing a premium feature user interface for use in conjunction with at least one embodiment of the present disclosure.

As further shown in FIG. 4 and discussed above, for at least one embodiment, the system 400 may be configured to support the use of a player's personal device 424, such as a smart phone or tablet. The player's personal device 424 may be configured to execute one or more software applications that provide premium features and functions that otherwise may not be supportable by a given EGM 402 and/or by a given gaming cabinet 418. For example, an EGM 402 may not be configurable to present information regarding a premium feature, such as the ability to interact with a lottery system using a user interface, on a display provided by a given EGM. Providing functionality which enables a player to interact with a lottery system to pick lottery numbers for one or more upcoming lottery games is one example of a premium feature or function. Other examples of premium features include, but are not limited to, providing a pari-mutual betting user interface, providing a fantasy sports user interface, providing sports betting user interfaces, generating documents in compliance with one or more tax reporting requirements, and others. FIG. 5 illustrates one embodiment of a premium feature user interface 500 which enables a player to access a premium feature using a validator 416.

More specifically and as shown for the embodiment illustrated in FIG. 5, a premium feature user interface 500 may include a visual representation of one or more premium features, such as the ability to pick lottery numbers and purchase a lottery ticket that is printed using a validator 416. As shown, the premium feature user interface 500 may include for presentation on a display device an EGM game window 502 configured to present the game play commonly associated with a given EGM game. For example, the EGM game window 502 may be configured to present a visual representation of a slot machine, a video poker game, or other information commonly associated with EGMs. The premium feature user interface 500 may also include an EGM betting/betting results window 504. This window 504 may be configured to present to a player betting related information, such as betting options, points remaining on the player's account, results of a given game turn and other commonly provided information. It is to be appreciated that EGM game window 502 and EGM betting/betting results window 504 may be configured to occupy any portion of an EGM's visual display areas, including a full-screen representation, and/or occupying separate areas when multiple display areas are presented.

As further shown in FIG. 5, a premium feature user interface 500 may also be configured to include one or more windows/display areas that relate to one or more premium features. Such display areas may include one or more menu items that may be presented in any desired display context, sizing, and position. It is to be appreciated that premium feature windows may be presented temporarily or permanently. The temporal nature and the sizing and other characteristics used for any given premium feature user interface may be specified by casino operators in advance and/or determined real-time based upon one or more rules engines. Such rules engines may be configured to present different premium feature user interfaces to different players based on, for example, the user's profile including their betting profile, whether they are a member of casino's playing club, the level of membership, the amount then being wagered, randomly and/or any based on any factor or criteria desired at any time by a casino operator.

In one embodiment, the premium feature user interface 500 may include a premium feature navigation window 506. Such window 506 may be configured to enable a player (also referred to herein as a user, and a user may also be a casino operator or any other person) to select from one or more premium features, such as those previously mentioned above and others. The window 506 may be configured, in accordance with at least one embodiment, to enable a user to select menu options that relate to a user's preferences, demographics, and otherwise. In one embodiment, a premium user interface may enable a user to provide financial information, such as social security and other information useful for IRS and other governmental body reporting obligations and other information. It is to be appreciated that such financial information may be permanently, temporarily or on some other basis stored by any component of casino system 132/401.

As further shown in FIG. 5 with respect to at least one embodiment of the present disclosure, a premium feature user interface 500 may include a premium feature branding window 508, wherein a casino operator, a premium feature provider or other entities may provide one or more branding, marketing, advertising, or other messages. It is to be appreciated that such window 508 may also be configured to provide sports scores, text messages, video messages and other information that may be particular to or of interest to a given player at that time. It is to be appreciated that the providing of such a premium feature desirably enables a casino to otherwise extend a player's involvement in a given EGM that might otherwise be lost.

As further shown in FIG. 5 with respect to at least one embodiment of the present disclosure, a premium feature user interface 500 may include a premium feature window 510. As shown for the lottery example of FIG. 5, the premium feature window 510 may be configured to present information specific to the premium feature—here, the ability to select lottery game numbers and purchase a lottery ticket using a validator 416.

As discussed above, at least one embodiment of the present disclosure enables a casino operator to present premium features using EGMs that are otherwise not configurable or with respect to which a casino operator does not desire to so configure to present one or more of windows 506, 508 and 510. Instead, for such an embodiment, a casino operator may enable a player to access the information otherwise to be presented to the player using one or more of windows 506, 508 and 510 by utilizing their personal communications device, such as a smart phone, tablet, smart-watch or other type of portable computing device. Per such an embodiment, one or more of windows 506, 508 and 510 may be presented using an application program executing on the personal device, where the application program is communicatively coupled with one or more of the casino system's servers. The presence of a given player relative to a given validator (and thereby to a given EGM and/or gaming cabinet) may be established and periodically verified using NCF, Bluetooth, GPS, and/or other position determination technologies.

Figure 6:
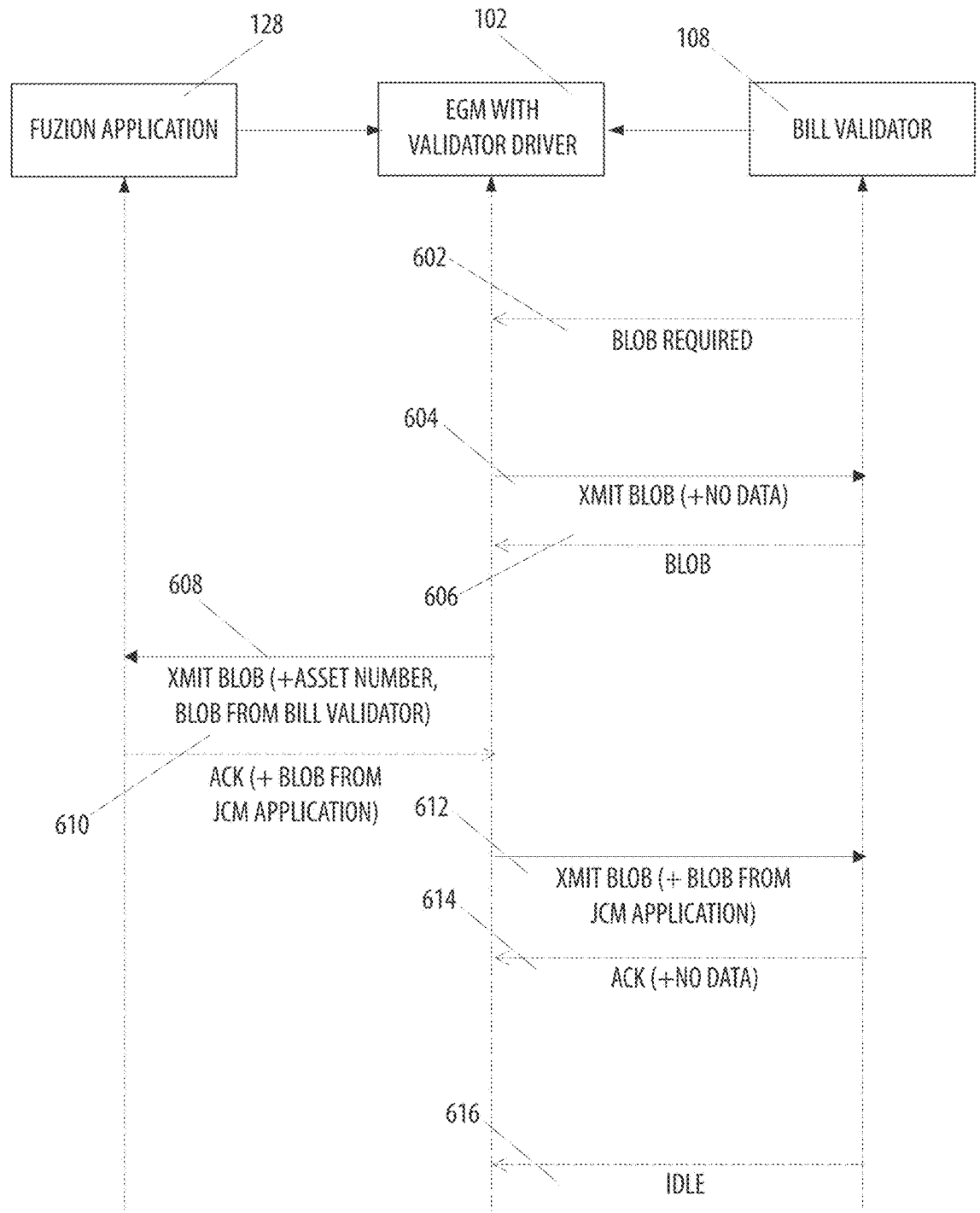
FIG. 6 is a sequence diagram illustrating a validator enablement protocol sequence, whereby a validator may seek enablement and/or re-enablement from an Enhanced Services system server or application, in accordance with at least one embodiment of the present disclosure.

FIG. 6 illustrates a validator enablement protocol sequence whereby a validator may seek enablement and/or re-enablement from an Enhanced Services system server or application. It is to be appreciated that a validator needs to be licensed and enabled to provide one or more premium features with respect to at least one embodiment of the present disclosure. In accordance with at least one embodiment, at least one validator premium feature function involves the use of a secondary validator port to provide one or more premium features. To provide such premium features, a bill validator may need to exchange a token with the Enhanced Services system server to enable the secondary validator port and the premium features associated therewith before such premium features may be used. In accordance with at least one embodiment, a validator may, after being enabled, also periodically exchange a token (a "blob") with the Enhanced Services system server. Examples of premium features that may need to be enabled and re-enabled by a validator include, but are not limited to, secondary port redemption of promotional vouchers, lottery tickets, betting tickets, currencies not recognized by a given EGM using its primary port and firmware downloads.

In accordance with at least one embodiment, when a validator 108 begins communicating, and periodically thereafter, with an Enhanced Services system server or application 128, for example, using the secondary validator port 113, a validator enablement protocol is invoked. As shown in FIG. 6, this protocol 600 begins with a "BlobRequired" message 602 being communicated from a validator 108 to a validator driver 102 which, as discussed above, may be provided in a peripheral controller 104, an EGM 102, or as an application executed by a casino system 132 server, such as the casino management system 118 or the Enhanced Services system 128 servers. Periodically thereafter, a validator may send a "BlobReady" message, where the "BlobReady" status indicates that the validator 108 needs to exchange a data blob with the Enhanced Services system 128 server. Examples of such data blob include, but are not limited to, token updates, metrics transfers, status updates, and other information regarding the operation, status or other condition of a validator 108. Further, for at least one embodiment, when premium features are enabled on the validator, but the license associated with such validator will be expiring soon, the validator may be configured to communicate a "BlobReady" message indicating the soon to expire status of the present license provided to the validator 108. Likewise, when premium features are not yet enabled, or have expired, the validator may be configured to communicate the "BlobRequired" status message to the component (e.g., the EMG) then providing the validator driver functionalities. For at least one embodiment, while a "BlobRequired" status message is pending, the validator may be configured to disallow the use and/or providing of one or more premium features.

As further shown in FIG. 6 for at least one embodiment of the present disclosure, the component providing the validator driver functionalities (the EMG 102 in this example) will determine whether a current, valid blob is available. If so, the blob is transmitted to the validator 108 in a message, such as message 604. The validator 108 is then configured to transmit the blob to the EGM whenever use of a premium feature is to be provided, as per message 606.

The EMG 102 then appends to the blob message 606 information that uniquely identifies the validator providing the blob, for example, by providing an asset number and/or other data utilized for a given embodiment to enable and/or verify a validator is then enabled to provide one or more premium features. This modified message 608 is communicated to the Enhanced Services application, which in accordance with at least one embodiment is executing on the Enhanced Services system 128 server.

The Enhanced Services application then determines whether the received modified message 608 identifies a validator that is then currently licensed to provide the requested premium feature(s). If so, an acknowledgement message 610 is communicated from the Enhanced Services application to the validator driver, executing for example on the EGM 102.

The validator driver then communicates a "Xmit Blob" message 612 to the validator 108. In accordance with at least one embodiment, the Xmit Blob message includes a blob received from the Enhanced Services application and a second blob provided by the validator driver itself. In short, for at least one embodiment of the present disclosure, two levels of authorizations, as represented by Blobs, are required to enable premium features on a validator with a first of such levels of authorization being provided by an Enhanced Services system server/application and a second of such levels of authorization being provided by a validator driver. As shown, the process continues with the validator 108 communicating an acknowledgement message 614 to the validator driver and periodically thereafter communicating an "idle" status message 616 to the validator driver, where the "idle" message indicates that the validator is enabled and ready to accept tickets. The periodicity of the idle status message 616 may be configured in accordance with the preferences of any given casino operator or system.

Other types of messages a system may use in communicating information and licenses by and between a validator driver and/or an Enhanced Services system server or application include, but are not limited to:
 a) status change messages;
 b) Bulk Blob Ready messages, which indicate that a validator has data to transmit to the validator driver and/or Enhanced Services system server/application;
 c) Download Ready messages, which indicate that the Enhanced Services server has a download ready to communicate to the validator;
 d) Power Up messages, which indicate that a validator has gone through a power-up event, for example, in response to a prior disruption of power;
 e) Inhibit messages, which indicate that a given validator is disabled;
 f) Escrow messages, which indicate that a bill or ticket was inserted and validated by the validator; where an escrow message may also be configured to communicate the amount, the type and other information regarding the validated ticket;
 g) Vend Valid messages, which indicate that an item has been fully stacked and credit should be given to a player;
 h) Reject messages, which indicate that an item has been rejected;
 i) Return messages, which indicate a previously provided item, such as a coupon, has been returned without being redeemed by the player; and
 j) Various other status messages, such as stacker full, communications failure, download status, jams, stacker condition, and otherwise.

It is to be appreciated that in at least one embodiment of the present disclosure a message communicated by and between the validator, the validator driver and/or the Enhanced Services system server/application may be repeated for any given number or attempts until an acknowledgement of receipt of such message by the final or intermediary destinations is received by the sender of such message.

It is to be appreciated that one or more hardware and/or software components commonly known in the art are utilized to establish and support the various data connections described herein. For purposes of brevity, such components, systems, protocols and the like are not discussed herein but the properties, capabilities, uses and technologies commonly known and provided for use therewith are incorporated herein by reference, such technologies and corresponding hardware and/or software devices and systems for facilitating use of such technologies include but not limited to compression, encryption, error correction, data conversion (e.g., from one protocol or format to another and vice versa) and other like.

Figure 7:
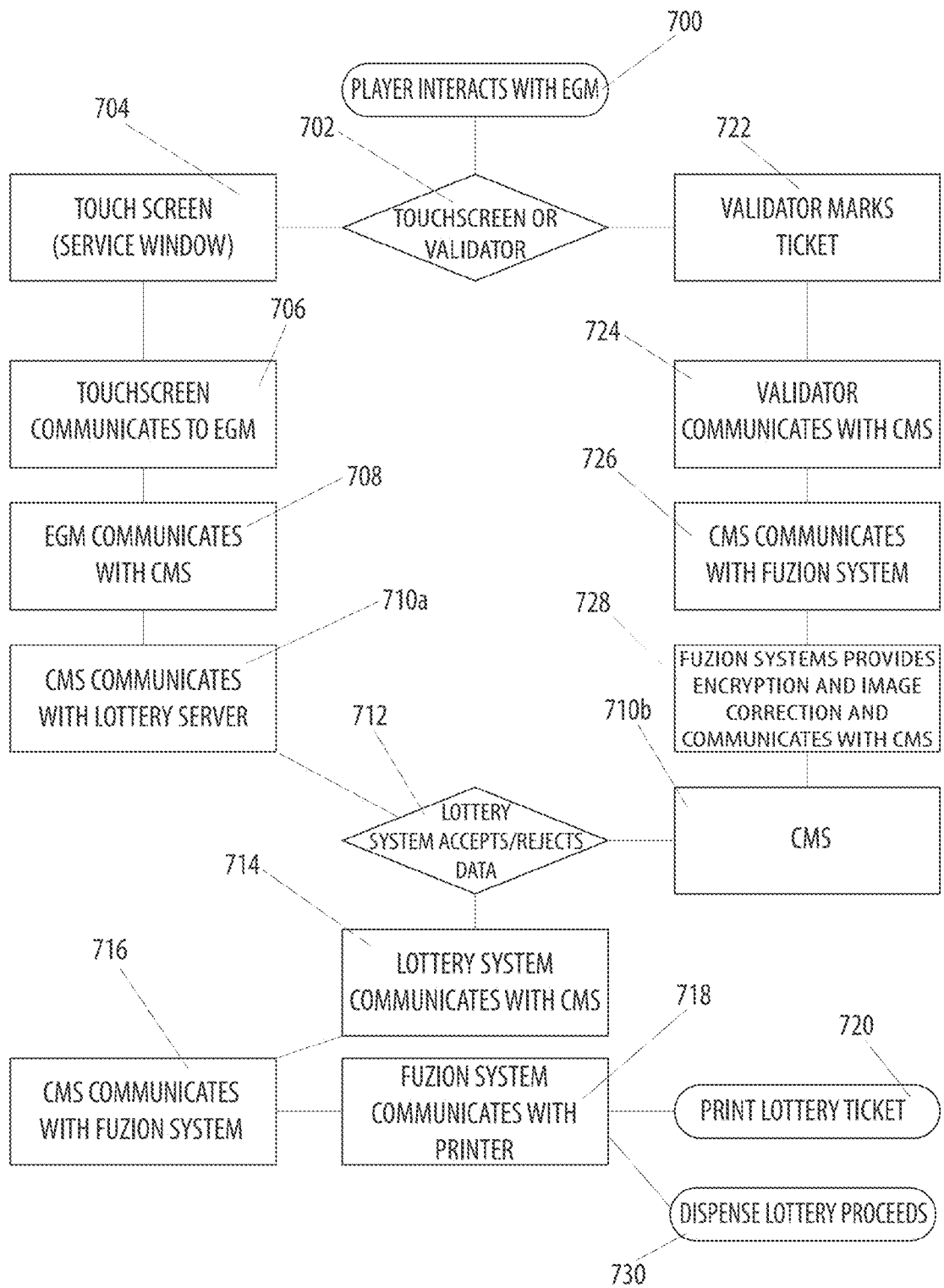
FIG. 7 is a flow chart illustrating a process by which a lottery premium feature may be utilized in accordance with at least one embodiment of the present disclosure.

Referring now to FIG. 7, a process by which a lottery premium feature may be utilized in accordance with at least one embodiment of the present disclosure begins when a player interacts with an EGM (Operation 700). It is to be appreciated for at least one premium feature embodiment, such as a lottery service, that a player may interact with an EGM by either selecting and purchasing a lottery ticket or redeeming a lottery ticket, which may have been purchased using the casino system 132 or via a third party. In Operation 702, a determination is made as to whether a purchase or a redemption event is requested. In one embodiment, this determination can be made by determining whether the request is originating from a touch screen or another user interface provided by an EMG or via a validator.

Assuming for this discussion that the player interaction has been initiated due to a purchase request, per Operation 704 the player is permitted to select their desired game (when more than one lottery game is available), desired numbers and number of tickets. In certain embodiments, a player may request a given set of numbers (which may be generated automatically upon selection of a "quick pick" option) to be utilized in a given number of future arising lottery drawings.

Per Operation 706, the player's input selections are communicated to the EGM and, per Operation 708, then to the Casino Management System ("CMS"). Upon the request reaching the CMS, the CMS may perform various housekeeping functions, such as verifying that the user can participate in the given lottery game, that the player has sufficient points to purchase the requested lottery tickets, that the points arise from funds originating from legitimate sources (such as wire transfer, currency deposits, winnings and not from credit originating funds) and otherwise.

Per Operation 710a, assuming the housekeeping verifications performed by CMS are acceptable, the CMS communicates the lottery ticket information to a lottery server 710a.

Per Operation 712, the lottery server 710a may either accept or reject the data received from the CMS. If the received data is not acceptable, the process terminates and messages are communicated using a return pathway to the player at the EGM that the transaction could not be completed. A basis for such rejection may be communicated to the player in one or more embodiments of the present disclosure.

If the lottery system accepts the request, in Operation 714, the lottery system communicates the information necessary to generate the lottery ticket to the CMS. It is to be appreciated that the information necessary to generate the lottery ticket may be encrypted and controlled by any known encryption, data protection and data transfer protocols desired.

In Operation 716, the CMS communicates the information received from the lottery system to the Enhanced Services system. In Operation 718, the Enhanced Services system communicates the accepted lottery ticket information to the printer and in Operation 720 the printer prints the lottery ticket and dispenses such lottery ticket to the player.

Referring again to Operation 702, at least one embodiment of the present disclosure enables the use of a validator to receive and redeem previously purchased lottery tickets. When a redemption event occurs, the process proceeds from Operation 702 to Operation 722 where the validator marks the lottery ticket. Per Operation 724, the validator then communicates the details received from the lottery ticket to the CMS. It is to be appreciated that the lottery ticket details may be recovered from a lottery ticket using those technologies specified by a lottery system administrator, such as using 2D data codes and other techniques.

Per Operation 726, the CMS communicates the information retrieved by the validator to the Enhanced Services system. Per Operation 728, the Enhanced Services system provides encryption and image correction processes to the received information and exports the results of these and any other desired processes back to the CMS.

The Operations then proceed with Operation 710b, which like Operation 710a involves the CMS communicating the lottery ticket information to the lottery system server for processing thereby. As per Operations 712-718 discussed above, the lottery system server performs whatever verifications required, communicates the results to the CMS and when redemption of a valid lottery ticket has been requested communicates a message to the CMS indicating the amount to be dispensed. This information is, in turn, communicated to the printer which dispenses the winning proceeds to the player 730 in the form of a TITO ticket or an updating of a balance on a pre-existing TITO ticket or an account associated with the player. It is to be appreciated that the above description of a process flow for utilizing a premium lottery service feature may be utilized in conjunction with the providing of other premium features with any variations required thereto commonly predicated on the particular needs and requirements of a provider of such other premium feature.

In some implementations, articles of manufacture are provided as computer program products that cause the instantiation of operations on a computer system to implement the invention. One implementation of a computer program product provides a non-transitory computer program storage medium readable by a computer system and encoding a computer program. It should further be understood that the described technology may be employed in special purpose devices independent of a personal computer. The above specification, examples and data provide a complete description of the structure and use of the various embodiments of the invention as defined in the claims.

Although various embodiments of the claimed invention have been described above with a certain degree of particularity, or regarding one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A system for providing premium features to a player of an electronic gaming machine in a casino environment comprising:
   the electronic gaming machine, configured to provide at least one gaming experience to the player;
   a peripheral controller communicatively coupled to the electronic gaming machine;
   a printer communicatively coupled, via a primary printer port, with the electronic gaming machine; whereby, via use of the primary printer port, the printer is configured to provide at least one basic printing service to the player; wherein the printer is communicatively coupled, via a secondary printer port, with a printer driver application; whereby, via use of the secondary printer port, the printer is configured to provide at least one premium printing service to the player;
   a validator communicatively coupled, via a primary validator port, with the electronic gaming machine; whereby, via use of the primary validator port, the validator is configured to provide at least one basic validation service to the player; wherein the validator is communicatively coupled, via a secondary validator port, with a validator driver application; whereby, via use of the secondary validator port, the validator is configured to provide at least one premium validation service to the player;
   a casino management system server configured to manage granting and redeeming of player points;
   an Enhanced Services system server configured to license and manage the providing of the at least one premium printing service and the at least one premium validation service to the player;
   a first network communicatively interconnecting each of the peripheral controller, the casino management system and the Enhanced Services system server;
   at least one third party server providing a premium third-party feature; and
   at least one second network communicatively interconnecting at least one of the casino management system and the Enhanced Services system server with the at least one third party server.

2. The system of claim 1, wherein the premium validation service is a lottery service.

3. The system of claim 1, wherein the peripheral controller is a smart device and the printer driver application is executed by the peripheral controller.

4. The system of claim 1, wherein the peripheral controller is a pass-through device and the printer driver application is executed on at least one of the casino management system server and the Enhanced Services system server.

5. The system of claim 1, wherein the functionalities provided by the peripheral controller and incorporated into the electronic gaming machine and the printer driver application are executed by the electronic gaming machine.

6. An electronic gaming, validation, and printing system comprising:
   an electronic gaming machine;

a printing device comprising:
  a first port; and
  a second port; and
a validator comprising:
  a third port; and
  a fourth port; wherein:
the printing device is communicatively coupled to the electronic gaming machine by the first port;
the printing device is operable to be configured, via the second port, to provide a printing service;
the validator is communicatively coupled to the electronic gaming machine by the third port;
the validator is configured to provide a first validation service; and
the validator is operable to be configured, via the third port, to provide a second validation service different from the first validation service.

7. The electronic system of claim 6, wherein the printing device and the validator are positioned within a gaming cabinet of the electronic gaming machine.

8. The electronic system of claim 6, further comprising a peripheral controller communicatively coupled to the printing device via the second port.

9. The electronic system of claim 8, wherein the peripheral controller is communicatively coupled to the validator via the fourth port.

10. The electronic system of claim 9, wherein the peripheral controller is configured to communicate with a remote server.

11. The electronic system of claim 10, wherein the peripheral controller is configured to operate in a pass-through mode in which the remote server is configured to communicate with the validator via the fourth port and the printing device via the second port.

12. The electronic system of claim 11, wherein the remote server is a casino management server.

13. The electronic system of claim 11, wherein the remote server is configured to provide one or more enhanced services to a user of the electronic gaming machine.

14. The electronic system of claim 13, wherein the one or more enhanced services includes a lottery ticket printing service.

15. The electronic system of claim 13, wherein the one or more enhanced services includes a tax form printing service.

16. An electronic gaming, validation, and printing system comprising:
  a casino management server;
  an electronic gaming machine;
  a peripheral control device operable in a pass-through mode; and
  a printing device communicatively coupled to the peripheral control device; wherein:
  the electronic gaming machine is communicatively coupled to the printing device via a first printing port; and
  the casino management server is communicatively coupled to the printing device via the peripheral control device and a secondary printing port when the peripheral control device is operating in the pass-through mode.

17. The electronic system of claim 16, further comprising a validator device communicatively coupled to the peripheral control device.

18. The electronic system of claim 17, wherein:
  the electronic gaming machine is communicatively coupled to the validator device via a first validator port; and
  the casino management server is communicatively coupled to the printing device via the peripheral control device and a secondary validator port when the peripheral control device is operating in the pass-through mode.

19. The electronic system of claim 17, further comprising an enhanced system server configured to verify at least one license of the validator device or the printer device.

20. The electronic system of claim 16, wherein the casino management system is configured to instruct the printing device to print a coupon.

* * * * *